US011903896B2

(12) United States Patent
Kentin et al.

(10) Patent No.: US 11,903,896 B2
(45) Date of Patent: Feb. 20, 2024

(54) FLEXIBLE EXOSUIT FOR ASSISTIVE MOBILITY

(71) Applicant: Skip Innovations, Inc., San Francisco, CA (US)

(72) Inventors: Rhoda Jill Kentin, Oakland, CA (US); Joseph Hollis Sargent, San Francisco, CA (US); Erik Lamers, Pittsburgh, PA (US)

(73) Assignee: Skip Innovations, Inc., San Francisco, CA (US)

( * ) Notice: Subject to any disclaimer, the term of this patent is extended or adjusted under 35 U.S.C. 154(b) by 436 days.

(21) Appl. No.: 17/079,735

(22) Filed: Oct. 26, 2020

(65) Prior Publication Data

US 2022/0125662 A1 Apr. 28, 2022

(51) Int. Cl.
*A61H 3/00* (2006.01)
*A61H 1/02* (2006.01)
*B25J 9/00* (2006.01)

(52) U.S. Cl.
CPC ............... *A61H 3/00* (2013.01); *A61H 1/024* (2013.01); *A61H 1/0244* (2013.01);
(Continued)

(58) Field of Classification Search
CPC ........ A61H 3/00; A61H 1/024; A61H 1/0244; A61H 1/0277; A61H 1/0281; A61H 2003/007; A61H 2201/165; B25J 9/0006
See application file for complete search history.

(56) References Cited

U.S. PATENT DOCUMENTS 6,725,124 B2 8/2004 Yan
6,907,310 B2 6/2005 Gardber et al.
(Continued)

FOREIGN PATENT DOCUMENTS

KR 20170077898 7/2017
WO WO 2017/044093 3/2017

OTHER PUBLICATIONS

All2dp.com [online], "2020 Best Free 3D Printing Software," Mar. 25, 2020, retrieved on May 14, 2020, retrieved from URL<https://all3dp.com/1/best-free-3d-printing-software-3d-printer-program/>, 41 pages.
(Continued)

*Primary Examiner* — Jerrah Edwards
*Assistant Examiner* — Aren Patel
(74) *Attorney, Agent, or Firm* — Mughal Gaudry & Franklin PC

(57) ABSTRACT

An exosuit includes a first structure including a series of link elements joined together by joints. The series of link elements extends along a length of the first structure. The joints are configured to flex such that, when the exosuit is worn by a user, the first structure at least partially conforms to a shape of the user's anatomy at a first side of the first structure that extends along the length. The joints restrict flexing that would deform a second side of the first structure extending along the length of the first structure. The exosuit includes a second structure and an actuator coupled to the first structure and the second structure. The actuator causes movement of the first structure relative to the second structure. The exosuit includes an attachment portion to attach the exosuit to the user with the first side of the first structure facing toward the user.

19 Claims, 10 Drawing Sheets

SIDE VIEW

(52) U.S. Cl.
CPC ......... *A61H 1/0277* (2013.01); *A61H 1/0281* (2013.01); *B25J 9/0006* (2013.01); *A61H 2003/007* (2013.01); *A61H 2201/165* (2013.01)

(56) References Cited

U.S. PATENT DOCUMENTS

| | | | |
|---|---|---|---|
| 7,678,147 | B2 | 3/2010 | Clifford et al. |
| 8,384,714 | B2 | 2/2013 | De Aguiar et al. |
| 8,838,263 | B2 | 9/2014 | Sivak et al. |
| 8,994,776 | B2 | 3/2015 | Sutherland et al. |
| 9,162,142 | B2 | 10/2015 | Shum et al. |
| 9,235,765 | B2 | 1/2016 | Bentley et al. |
| 9,265,647 | B2 | 2/2016 | DeSousa |
| 9,457,589 | B2 | 10/2016 | Miller et al. |
| 9,460,557 | B1 | 10/2016 | Tran et al. |
| 9,562,742 | B2 | 2/2017 | Popovici |
| 9,665,906 | B2 | 5/2017 | Adeyoola et al. |
| 9,737,239 | B2 | 8/2017 | Kimmel |
| 9,788,600 | B2 | 10/2017 | Wawrousek et al. |
| 9,792,479 | B2 | 10/2017 | Mallet et al. |
| 9,895,841 | B2 | 2/2018 | Page |
| 9,928,633 | B2 | 3/2018 | Cotter et al. |
| 10,067,500 | B2 | 9/2018 | Hargovan et al. |
| 10,390,973 | B2 | 8/2019 | Tong et al. |
| 10,555,792 | B2 | 2/2020 | Kopelman et al. |
| 2003/0120183 | A1 | 6/2003 | Simmons |
| 2014/0007016 | A1 | 1/2014 | Li |
| 2016/0107309 | A1 | 4/2016 | Walsh et al. |
| 2016/0088284 | A1 | 5/2016 | Sareen et al. |
| 2016/0128890 | A1 | 5/2016 | LaChappelle et al. |
| 2016/0247017 | A1 | 8/2016 | Sareen et al. |
| 2016/0349738 | A1 | 12/2016 | Sisk |
| 2017/0202724 | A1 | 7/2017 | Rossi et al. |
| 2017/0231794 | A1 | 8/2017 | Church |
| 2017/0287212 | A1 | 10/2017 | Tran et al. |
| 2018/0243155 | A1 | 8/2018 | Angold et al. |
| 2019/0035149 | A1 | 1/2019 | Chen et al. |
| 2019/0070061 | A1* | 3/2019 | Choi .......... A61H 3/00 |
| 2019/0254912 | A1* | 8/2019 | Lee ............ A61H 1/0262 |
| 2019/0299522 | A1 | 10/2019 | Chapiro et al. |
| 2019/0328604 | A1 | 10/2019 | Contreras-Vidal et al. |
| 2019/0365554 | A1* | 12/2019 | Davies-Sekle ......... A61F 5/013 |
| 2019/0380904 | A1 | 12/2019 | Panizzolo et al. |
| 2020/0082138 | A1 | 3/2020 | Newman |
| 2020/0155264 | A1* | 5/2020 | Waterman .......... A61B 90/60 |
| 2021/0128390 | A1* | 5/2021 | Choi ............. A61H 3/00 |
| 2021/0349445 | A1* | 11/2021 | Zealand .......... G06F 3/016 |

OTHER PUBLICATIONS

All2dp.com [online], "3D Printed Cloths: Myth or Reality?," Jun. 27, 2019, retrieved on May 14, 2020, retrieved from URL<https://all3dp.com/2/3d-printed-cloths-myth-or-reality/, 9 pages.

Ashley, "Robotic Exoskeletons Are Changing Lives in Surprising Ways," Feb. 21, 2017, retrieved on Mar. 31, 2020, retrieved from URL <https://www.nbcnews.com/mach/innovation/robotic-exoskeletons-are-changing-lives-surprising-ways-n722676>, 4 pages.

avanti.care [online], "Powered clothing & exo-skeletons: Technology in care," May 15, 2019, retrieved from URL <https://avanti.care/powered-clothing-exo-skeletons/>, 4 pages.

biodesign.seas.harvard.edu [online], "Soft Exosuits," Jan. 27, 2017, retrieved on Mar. 31, 2020, retrieved from URL <https://biodesign.seas.harvard.edu/soft-exosuits>, 3 pages.

Dormehl, "This sleek new exoskeleton makes walking easier, fits under your clothes," Mar. 25, 2019, retrieved from URL <https://www.digitaltrends.com/cool-tech/vanderbilt-ankle-exoskeleton/>, 6 pages.

Dorrier, "Robotic Exoskeletons, Like This One, Are Getting More Practical," Dec. 18, 2019, retrieved on Mar. 31, 2020, retrieved from URL <https://singularityhub.com/2019/12/18/robotic-exoskeletons-like-this-one-are-getting-more-practical/>, 2 pages.

Dummies.com [online], "How to Scan Objects for 3D Printing," retrieved on May 14, 2020, retrieved from URL<https://www.dummies.com/computers/pcs/printers/how-to-design-in-the-computer-for-3d-printing//>, 6 pages.

Exoskeletonreport.com [online], "Seismic Powered Clothing—A Consumer Wellness Experience," Jan. 17, 2019, retrieved from URL <https://exoskeletonreport.com/2019/01/seismic-powered-clothing-a-consumer-wellness-experience/>, 4 pages.

fit3d.com [online], "Use your Body Scans to Buy Better Fitting Clothes," Nov. 9, 2018, retrieved on Mar. 31, 2020, retrieved from URL <https://fit3d.com/blog/personalized-clothing>, 2 pages.

Lacy, "Amazon Might Use 3D Body Scans to Customize Clothes—and Also Capture Your Data," Jul. 21, 2019, retrieved from URL <https://www.adweek.com/retail/amazon-might-use-3d-body-scans-to-customizeclothes-and-also-capture-your-data/>, 2 pages (Excerpt only).

Lee, "3D body scanner promises perfectly fitting clothes," Oct. 3, 2019, retrieved on Mar. 31, 2020, retrieved from URL <https://www.engadget.com/2019-10-03-virtual-try-on-scanatic-fashion.html>, 10 pages.

Marinov, "SRI Robotics Super Flex Exosuit," Apr. 13, 2016, retrieved on Mar. 31, 2020, retrieved from URL <https://exoskeletonreport.com/2016/04/sri-robotics-super-flex-exosuit/>, 4 pages.

Morby, "Yves Béhar's Aura Power Clothing helps the elderly with mobility," Jan. 12, 2017, retrieved from URL <https://www.dezeen.com/2017/01/12/yves-behar-aura-power-clothing-helps-elderly-mobility-design-museum-london/>, 16 pages.

myseismic.com [online], "A fusion of apparel and robotics," Sep. 8, 2018, retrieved from URL <https://www.myseismic.com/>, 9 pages.

Pardes, "The Perfect Pair of Pants Is Just a 3D Body Scan Away," Feb. 28, 2019, retrieved on Mar. 31, 2020, retrieved from URL <https://www.wired.com/story/bespoke-clothing-3d-body-scans/>, 5 pages.

rewalk.com [online], "About Products," Apr. 28, 2019, retrieved on Mar. 31, 2020, retrieved from URL <https://rewalk.com/about-products-2/>, 8 pages.

rewalk.com [online], "The ReStore Soft Exo-Suit," Dec. 20, 2019, retreieved from URL <https://rewalk.com/restore-exo-suit/>, 5 pages.

TechCrunch [online], "Electronic Apparel debuts a new line of powered clothing at Disrupt SF 2018," Sep. 17, 2018, retrieved on Mar. 31, 2020, retrieved from URL <https://www.youtube.com/watch?v=9_CTXRND3sU>, 1 page [Video Submission].

Visionline [online], "Automated 3D Model Creation," retrieved on May 14, 2020, retrieved from URL<https://www.visiononline.org/company-profile-detail.cfm/machine-vision/photoneo/company_id/1005, 4 pages.

wikipedia.org [online], "Powered exoskeleton," retrieved from URL <https://en.wikipedia.org/wiki/Powered_exoskeleton>, Mar. 2020, 12 pages.

wyss.harvard.edu [online], "Soft Exosuits for Lower Extremity Mobility," Nov. 7, 2019, retrieved on Mar. 31, 2020, retrieved from URL <https://wyss.harvard.edu/technology/soft-exosuits-for-lower-extremity-mobility/>, 7 pages.

Cyberdyne.jp [online] "HAL For Living Support Single Joint Type," 2020, retrieved on Oct. 20, 2020, retrieved from URL <https://www.cyberdyne.jp/english/products/SingleJoint.html>, 6 pages.

Lee et al., "Biomechanical Design of a Novel Flexible Exoskeleton for Lower Extremities," IEEE/ASME Transactions on Mechatronics, Oct. 2017, 22(5):2058-2069.

Moon et al., "Development of a Single Leg Knee Exoskeleton and Sensing Knee Center of Rotation Change for Intention Detection," Sensors, 2019, 19(3960):19 pages.

Park et al., "A Soft Wearable Robotic Device for Active Knee Motions using Flat Pneumatic Artificial Muscles," 2014 IEEE International Conference on Robotics & Automation, May 31-Jun. 7, 2014, 6 pages.

Sridar et al., "A Soft-Inflatable Exosuit for Knee Rehabilitation: Assisting Swing Phase During Walking," Frontiers in Robotics and AI, May 2018, 5(44):9 pages.

* cited by examiner

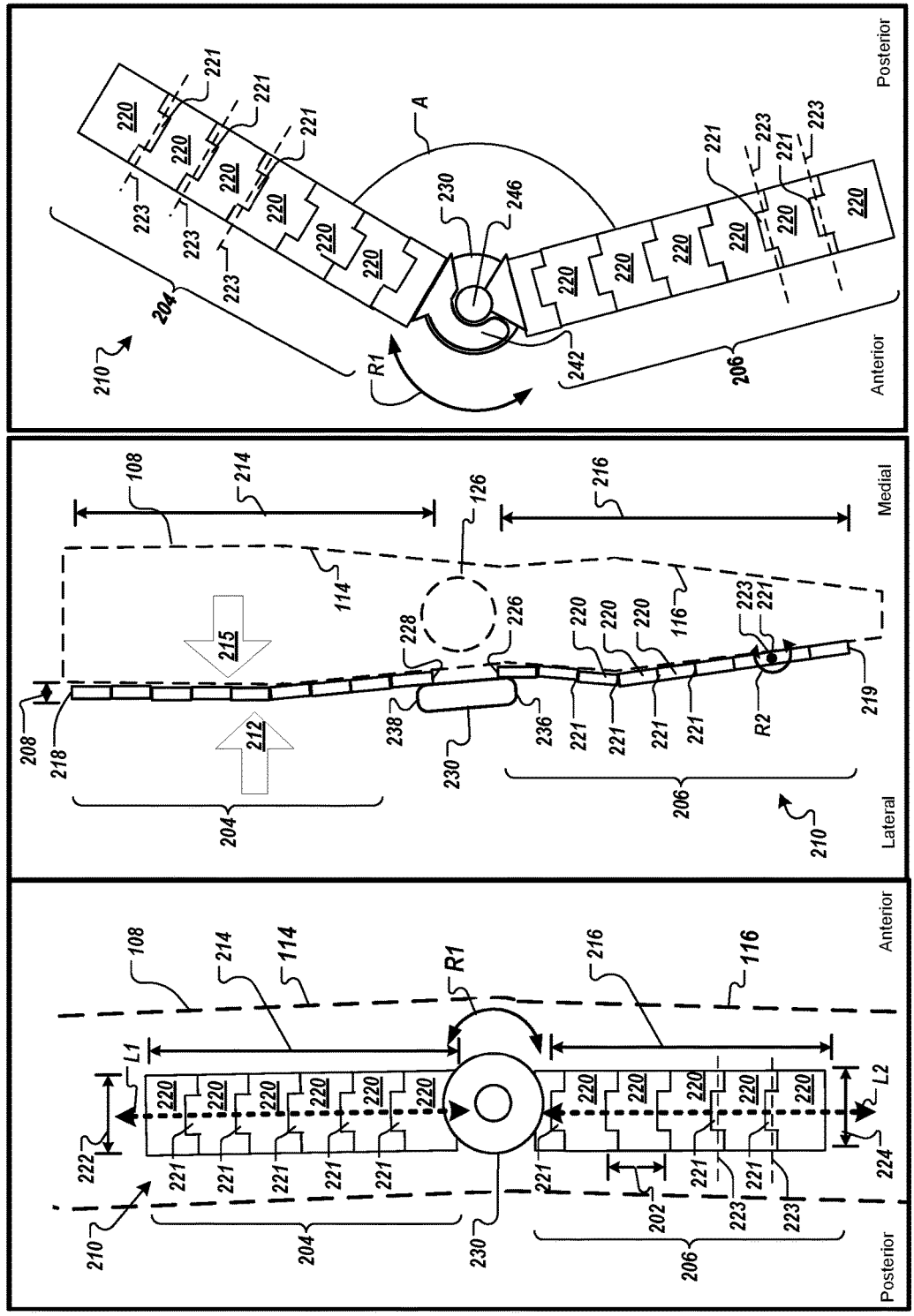

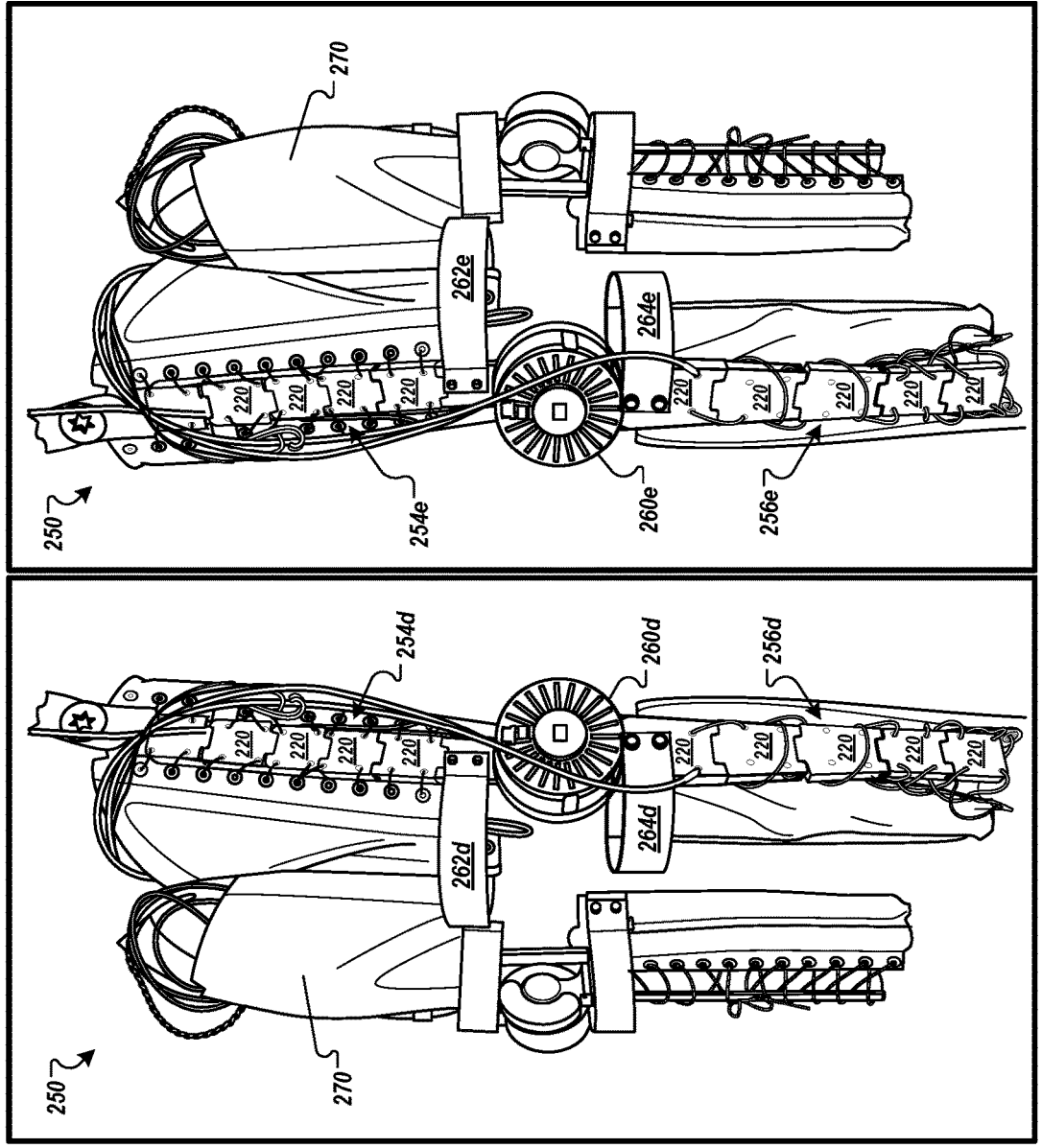

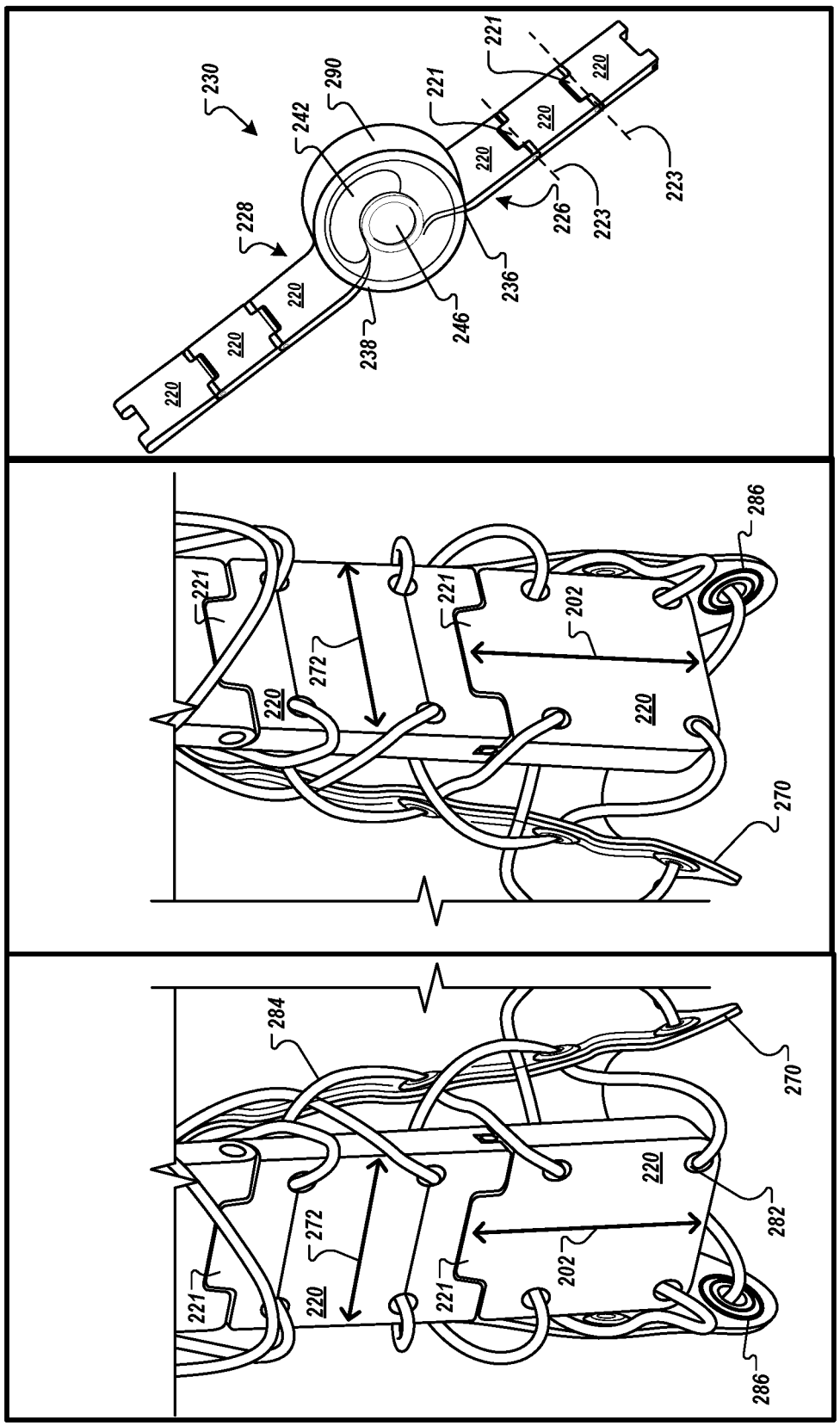

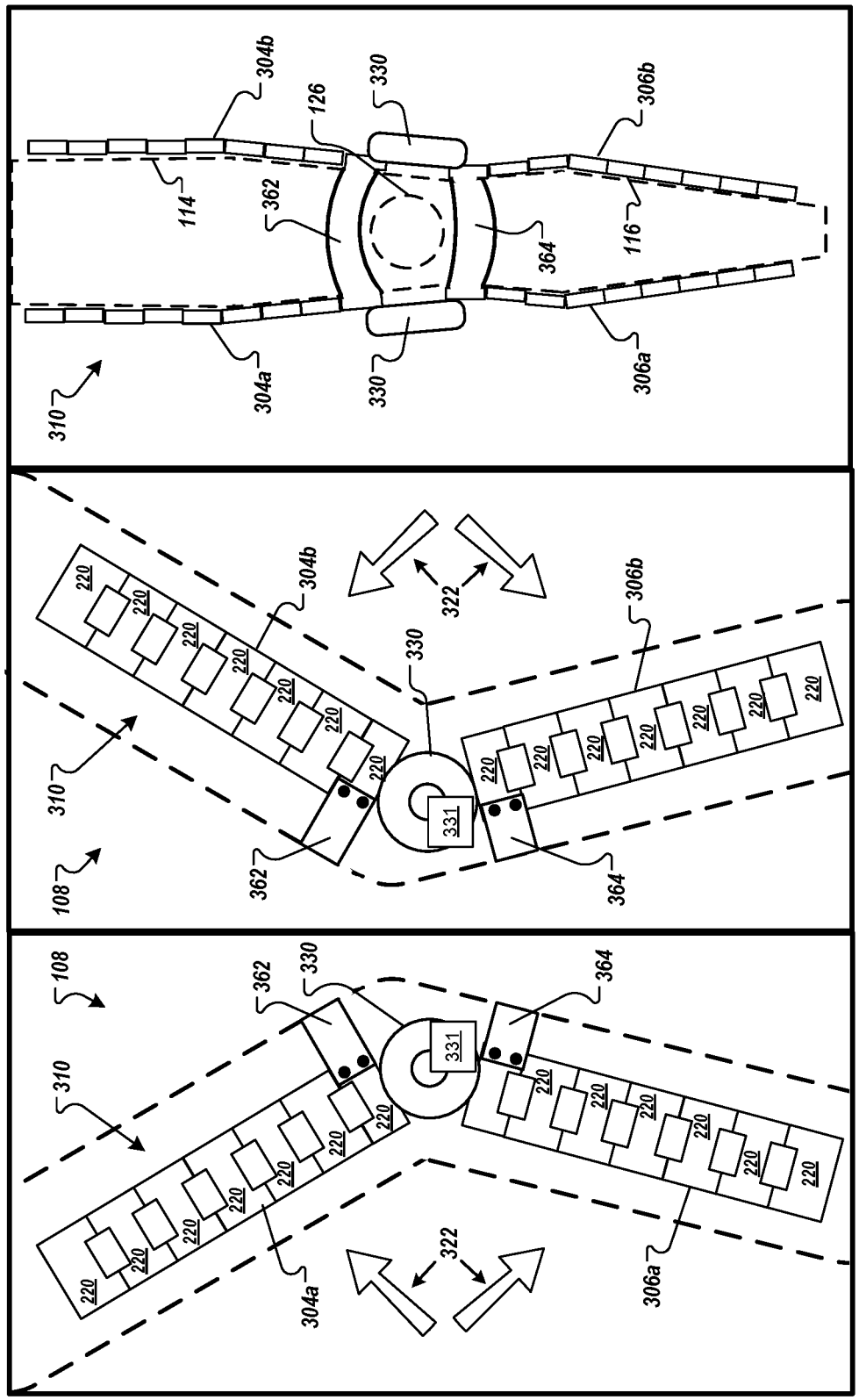

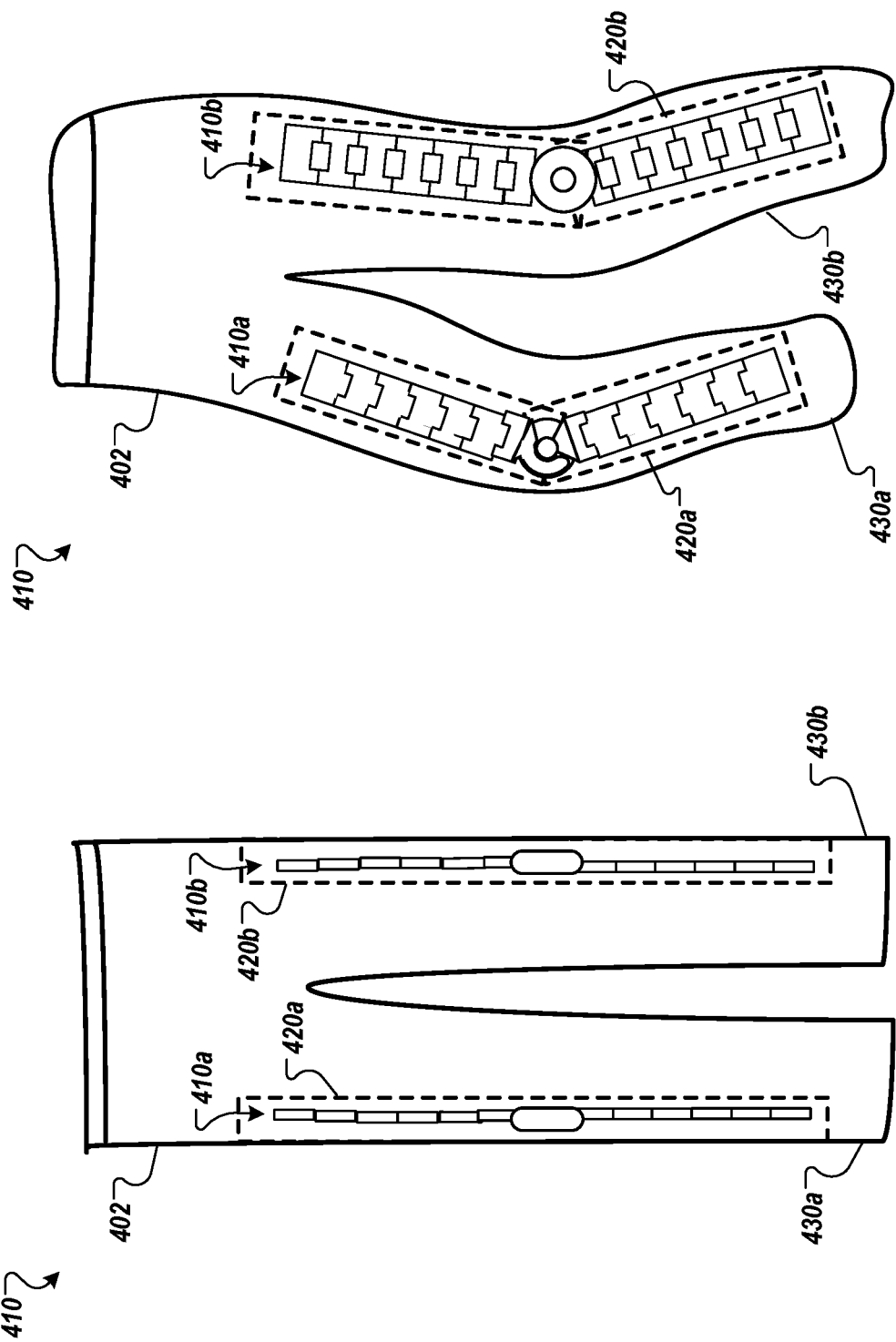

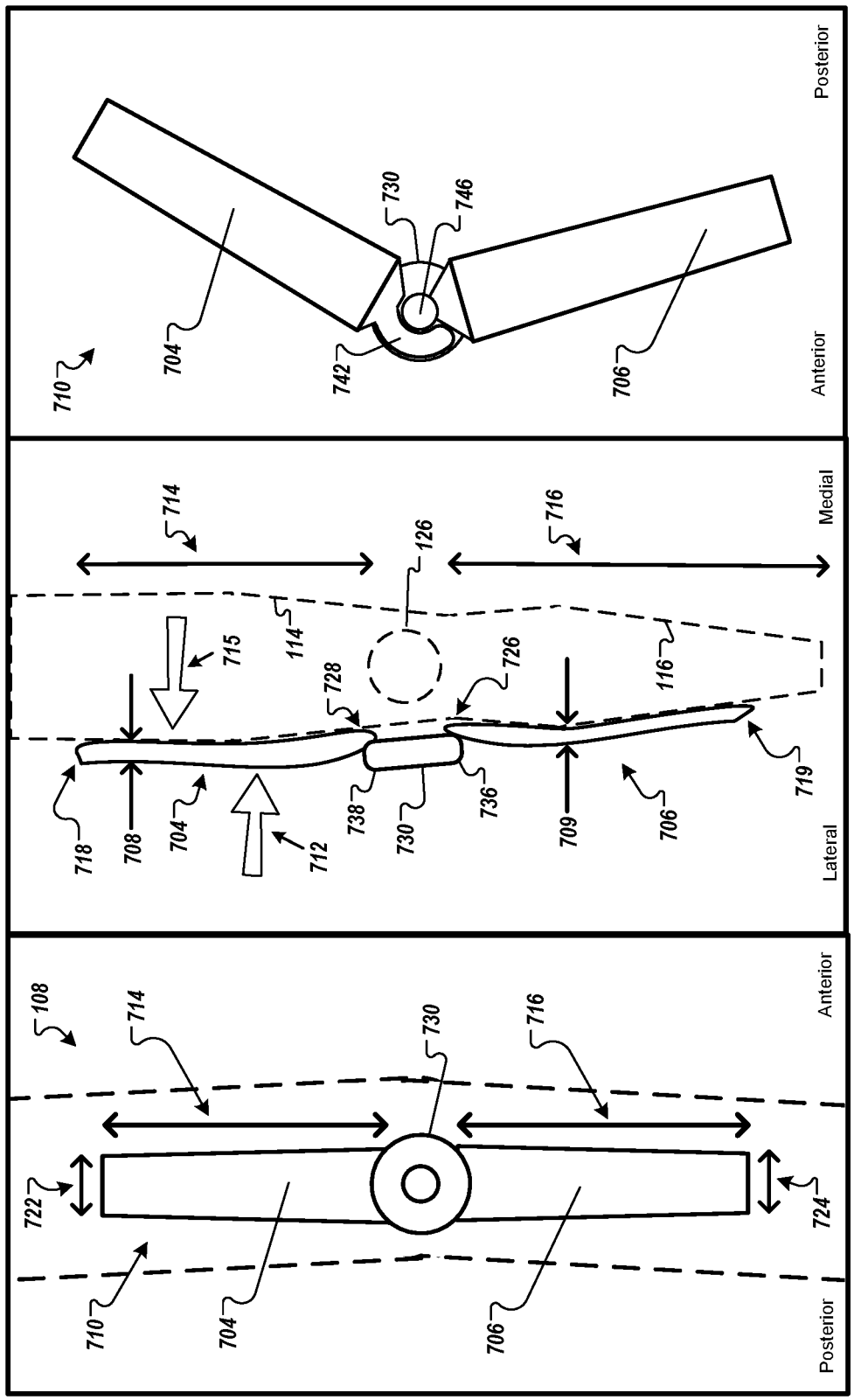

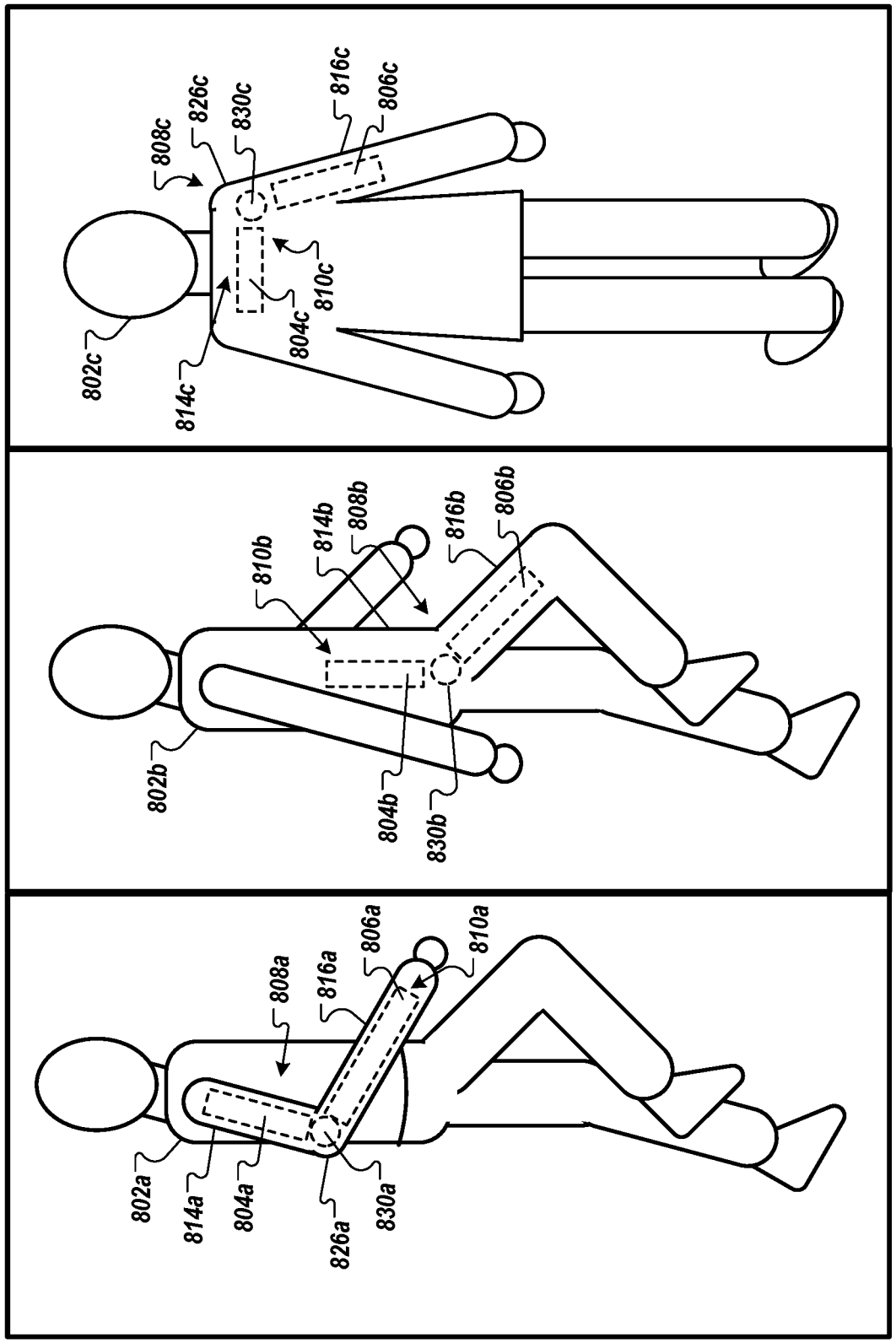

FLEXIBLE EXOSUIT FOR ASSISTIVE MOBILITY

TECHNICAL FIELD

This specification generally relates to support systems for human mobility.

BACKGROUND

Exosuits include devices such as powered exoskeletons, mechanically assistive clothing, and other devices that a person can wear to support or enhance movement. For example, an exosuit can be a powered device that includes structures that apply forces to a user's body in order to support or enhance a user's mobility. Presently available devices that provide support for users can be rigid, heavy, and uncomfortable, and are usually conspicuous.

SUMMARY

In some implementations, an exosuit can be configured to support the function of a joint of a user's body. For example, the exosuit can be worn to mechanically support the proper function of a user's knee, elbow, wrist, shoulder, hip, or other joint. The support may be provided to, for example, reduce the effort required by the wearer, provide greater stability of the joint for the wearer, allow movements that the wearer is not strong enough to perform on his or her own, and so on. The exosuit can be a low-profile exoskeleton and can be integrated into a garment, such as a pair of pants. The garment can fit closely to the user's body so the garment can transfer force from the exosuit to the user's body to assist with body movements such as extension, flexion, abduction, and adduction.

The exosuit can include a structure that extends along a portion of a limb or another portion of the body to transmit force to the user's body. This structure can be designed to respond differently to forces applied from different directions. To transmit forces along the length of the structure and to the user's body, the structure may be rigid in the direction or forces applied by the exosuit, so forces applied by actuators of the exosuit are transmitted along the structure to cause movement of the user's body. In addition, to provide a good fit to the user's body, the structure can flexible so that the structure can bend, flex, or otherwise be re-shaped when worn to conform to and align with a surface of the user's body. By conforming to the shape of the user's body, the exosuit can be more comfortable for the user and can also be much less bulky. This flexibility can also improve the appearance of the exosuit and reduce the size and profile of the exosuit, so the exosuit can be inconspicuously worn as part of a garment or undergarment. To achieve the desired properties, example exosuits discussed below have structures that can readily flex or deform in response to forces in one direction, but at the same time can be substantially rigid and resist deformation in response to forces applied in a different direction. These structures achieve the objectives of transmitting forces from an actuator along the length of the structure and to the user's body while also being flexible to conform to the user's body to enhance comfort and reduce the size of the exosuit.

As an example, an exosuit for the lower body can have an actuator near the wearer's knee, with a structure extending along the user's lower leg and another structure extending along the wearer's upper leg. The structures that extend along the leg can be rigid in a sagittal plane, so that when a motor or other actuator applies force to flex or extend the knee, the force is transmitted along the structure and distributed along the length of the structure and the corresponding portion of the user's leg. The structures can also be flexible in a coronal plane to conform to the contours of the wearer's leg. For example, the structure can have a side that faces toward and lays against the medial or lateral side of the patient's leg, and when worn, shapes itself to the general contour of the patient's leg. In other words, flexibility in the mediolateral dimension can enable the exosuit to conform to contours of the user's body, while rigidity in the anteroposterior dimension can enable the exosuit to exert forces on the user's body to assist with extension and flexion of the knee.

The combination of flexibility in one plane and rigidity in another can be provided using, for example, a structure formed by a series of link elements, with each hinge element connected to the next link element with a hinge or hinge-like connection. The hinge connections can each allow substantially uniaxial movement, e.g., one degree of freedom allowing motion primarily in or essentially only in one plane. Each hinge connection can allow rotation about a fixed axis, and the axes of the different hinge connections can be aligned, e.g., with the axes oriented parallel to each other. As a result, rotation about the various hinge axes can align a side of the structure to conform to the contour of a person's leg. For example, if the structure is positioned to be placed along the outer thigh of the wearer, the axes can be oriented substantially parallel to each other and in a substantially anterior-posterior direction, so that flexion along the hinge axes causes the structure to adjust or adapt in order to lie flat along the lateral side of the wearer's leg. Similar structures can be used at the medial side of the leg, at the medial and/or lateral side of the lower portion of the leg (e.g., below the knee), or along other parts of the body.

The exosuits discussed herein can be implemented in the form of a garment that is worn by a user, e.g., pants, shirt, jacket, etc. The mechanical elements of the exosuit can be embedded or otherwise integrated with the garment. For example, the garment can include fabric having pockets, channels, space between layers, or other openings that receive the motorized portions of the exosuit. The actuators and support structures, as well as control devices, batteries, wiring, and other parts of the exosuit, can be hidden in or underneath fabric of the garment to reduce signs that mechanical assistance is being provided. The mechanical components that provide mobility assistance can be attached to the garment, e.g., with straps, ties, clips, sewing, buttons, snaps, zippers, hook-and-loop fasteners, or other fasteners.

The fabric of a garment may be used to provide the functional assistance to the wearer. For example, the garment can fit snugly to the user and act as an attachment portion to couple the exosuit to the user. Force generated by an actuator may be transmitted through structures of the exosuit, such as a structure of link elements extending along a portion of a user's limb. The structures may then transmit the force to the user's limb through the connection of the structures to the garment. For example, structure(s) extending along a patient's lower leg can be embedded in the fabric of a pair of pants. When a motor applies a force to the structure(s), the fabric of the pants that extends around the wearer's lower leg can distribute the forces on the structure(s) along a greater surface area of the leg for increased comfort.

The flexibility of structures of the exosuit can also enable the exosuit to feel and behave more like clothes. For example, when the user takes off the exosuit, rather than remain rigid as most exosuits due, the structures formed with hinged connections can collapse when not worn by a user. When not positioned alongside the user's body by virtue of being worn, the structures can bend loosely, allowing the garment containing the exosuit to crumple or fall into a heap similar to the way a fabric garment would. Despite the structural elements of the exosuit, the garment with the powered, mechanical assistive functionality can collapse, crumple, and/or fold instead of remaining rigid. Collapsibility can improve ease of donning and doffing the exosuit, when compared to rigid non-collapsible devices. Collapsibility can also allow the user to store, wash, and transport the exosuit with ease.

In more detail, the exosuit can include a joint that is actuated by an actuator. For example, the joint can be positioned to align with a joint of the user's body, such as a knee, elbow, hip, ankle, etc. A first structure is coupled to a first side of the actuated joint of the exosuit, and a second structure coupled to a second side of the actuated joint. The first structure and the second structure can each include two or more link elements. Each link element can be a rigid body connected to an adjacent link element by a hinge or hinge-like connection.

The first structure and the second structure can each have a width along a first axis, e.g., an anteroposterior axis. The first structure and the second structure can each have a length along a second axis, e.g., a longitudinal or superior-inferior axis, that is perpendicular to the first axis. The first structure and the second structure can each have a thickness along a third axis, e.g., a mediolateral axis, perpendicular to the first axis and the second axis. The first structure and the second structure can each be rigid to resist forces in one direction, such as forces applied in a sagittal plane, and yet be flexible to allow movement in response to forces in a different direction, such as forces along a coronal plane.

The first structure and second structure each have a proximal end coupled to the joint and a distal end separated from the joint by the length of the structure. When worn by a user, the joint of the exosuit aligns with a joint of the user's body, e.g., a knee. The first structure can conform to and be disposed along a first portion of the user's body, e.g., along the upper leg, such as from the knee upward. The second structure can conform to and be disposed along the user's body at a second portion of the user's body, e.g., along the lower leg, such as from the knee downward.

In operation, the exosuit uses an actuator to move the first structure relative to the second structure. For example, the actuator can cause a rotational movement to change the angle of the first structure relative to the second structure. In the case of support for the knee joint, the first structure can transmit a force to the upper leg, and the second structure can transmit a force to the lower leg. The forces applied by the exosuit can assist in movement of the user's joint, such as to help flex, extend, or stabilize the user's joint, allowing the user to move with less effort.

One innovative aspect of the subject matter described in this specification is embodied in an exosuit including a first structure that includes a series of link elements joined together by joints. The series of link elements extends along a length of the first structure. The joints are configured to flex such that, when the exosuit is worn by a user, the first structure at least partially conforms to a shape of the user's anatomy at a first side of the first structure that extends along the length of the first structure. The joints restrict flexing that would deform a second side of the first structure that extends along the length of the first structure. The exosuit includes a second structure and an actuator coupled to the first structure and the second structure. The actuator is configured to cause movement of the first structure relative to the second structure. The exosuit includes an attachment portion to attach the exosuit to the user with the first side of the first structure facing toward the user.

These and other embodiments may each optionally include one or more of the following features. In some implementations, the joints are hinge connections between link elements.

In some implementations, each joint has an axis, and each joint is configured to bend about its axis and to resist bending in directions other than about its axis.

In some implementations, the respective axes of the joints are substantially parallel to each other.

In some implementations, the exosuit is configured to be worn with the length of the first structure extending along a medial or lateral side of a leg of the user, with the first structure being positioned along the thigh of the user or the lower leg of the user, such that (i) the axes of the joints extend in a substantially anteroposterior direction when worn by the user, the joint permitting relative movement of the link elements to adjust the shape of the first structure through a coronal plane of the user, and (ii) the joints of the first structure resist movements that would deform the first structure through a sagittal plane of the user.

In some implementations, each joint connects two adjacent link elements and is configured to flex about a corresponding axis and to disallow other relative movement between the two adjacent link elements connected by the joint.

In some implementations, the second structure includes a second series of links joined together by joints. The joints are configured to flex to enable the second structure to conform to a shape of the user's anatomy at a first side of the second structure. The joints restrict flexing that would deform a second side of the second structure.

In some implementations, the exosuit is configured to place the first structure along a limb of the user when worn by the user.

In some implementations, the exosuit is configured to place the first structure along a medial or lateral side of an upper portion of an arm of the user, a lower portion of an arm of the user, an upper portion of a leg of the user, or a lower portion of a leg of the user.

In some implementations, the actuator is configured to drive at least one of the first structure or the second structure to cause rotational movement of the first structure relative to the second structure about an axis.

In some implementations, the exosuit is configured to place the actuator adjacent to a body joint of the user when the exosuit is worn by the user. The actuator is configured to provide force to actuate the body joint of the user by transmitting forces to the first structure and second structure which in turn transmit forces to portions of the user's body through the attachment portion.

In some implementations, the movement caused by the actuator between the first structure and the second structure assists with extension and flexion of the body joint. In some implementations, the body joint includes a knee, an elbow, a hip, or a shoulder of the user.

In some implementations, the attachment portion includes a garment, the exosuit being attached to the garment. In some implementations, the first structure is positioned between fabric layers of the garment. In some implementations, the exosuit is attached to the garment by one or more of buttons, snaps, zippers, or sewing. In some implementations, the exosuit is removable from the garment.

In some implementations, the series of link elements includes a chain of link elements having a first length extending from a first end to a second end, the first structure being coupled to the actuator at the first end.

In some implementations, the exosuit includes a connecting portion coupled to the first structure; and a third structure coupled to the connecting portion, the third structure having a third length extending approximately parallel to the first length. When worn by the user, the first structure is disposed along a side of a limb of the user and the third structure is disposed along another side of the limb of the user.

In some implementations, the actuator is an electric motor, a hydraulic actuator, or a pneumatic actuator.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIG. 2A shows a side view of an example exosuit.

FIG. 2B shows a front view of the example exosuit of FIG. 2A.

FIG. 2C shows a view of an inner side (e.g., user-facing side) of the example exosuit of FIG. 2A.

FIG. 2D shows a left perspective view of an example exosuit.

FIG. 2E shows a right perspective view of the example exosuit of FIG. 2D.

FIG. 2F shows a left perspective view of elements of an example exosuit.

FIG. 2G shows a right perspective view of elements of an example exosuit.

FIG. 2H shows a perspective view of a joint of an example exosuit.

FIG. 3A shows an outside view of an example dual-sided exosuit.

FIG. 3B shows an inside view of the example dual-sided exosuit of FIG. 3A.

FIG. 3C shows a front view of the example dual-sided exosuit of FIG. 3A.

FIG. 4A shows a front view of an example exosuit embedded in a garment.

FIG. 4B shows a left side view of the example exosuit of FIG. 4A.

FIGS. 7A-7C show a side view, a front view, and a view of an inner side of another example exosuit.

FIG. 8A is an illustration of an example exosuit worn on an arm of a user.

FIG. 8B is an illustration of an example exosuit worn on a hip of a user.

FIG. 8C is an illustration of an example exosuit worn on a shoulder of a user.

Like reference numbers and designations in the various drawings indicate like elements. The components shown here, their connections and relationships, and their functions, are meant to be examples only, and are not meant to limit the implementations described and/or claimed in this document.

DETAILED DESCRIPTION

Figure 1:
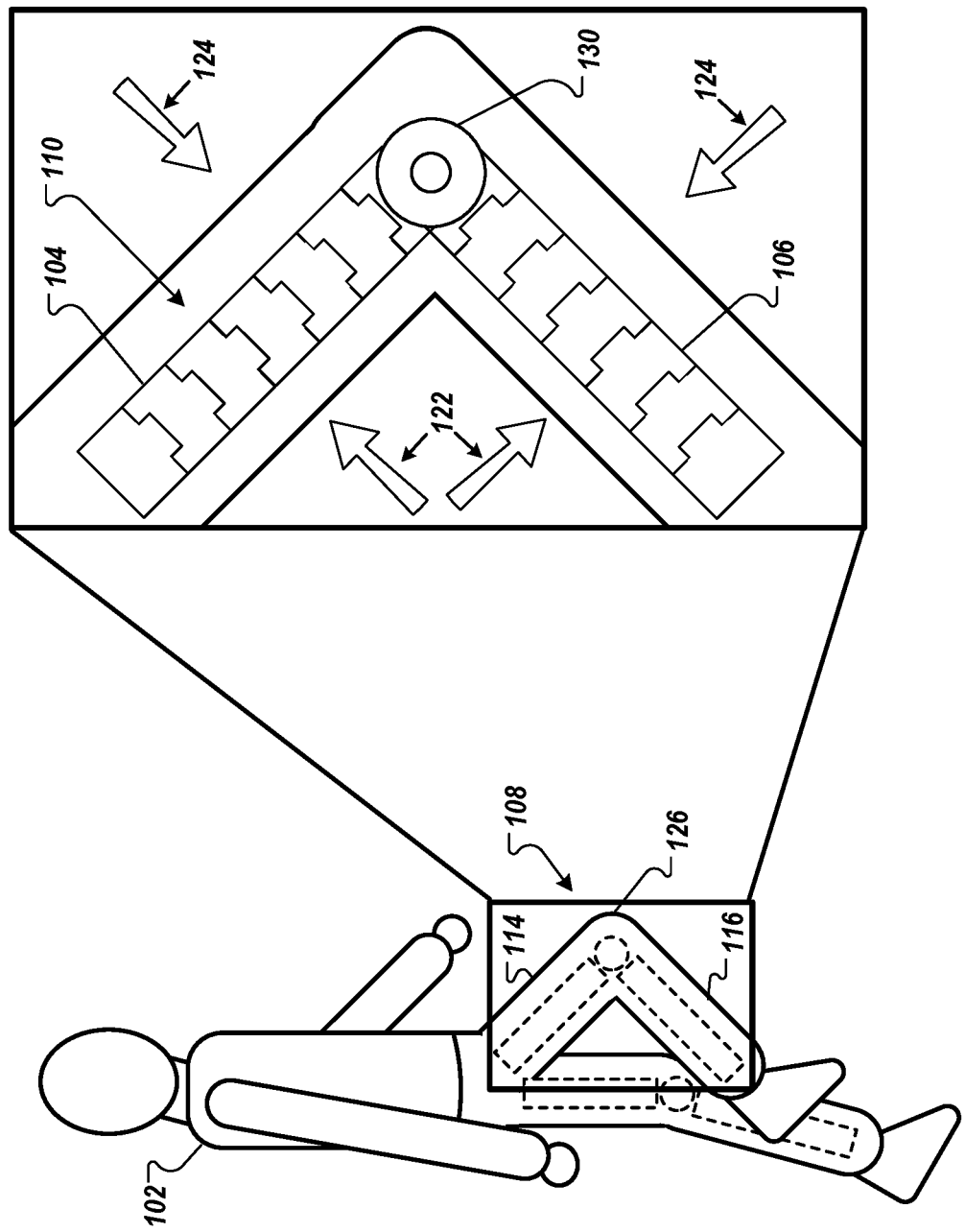
FIG. 1 is an illustration of an example exosuit worn on a leg of a user.

FIG. 1 is an illustration of an example exosuit 110 in use by a user 102. The exosuit 110 is worn on a leg 108 of the user 102. In the example of FIG. 1, the user's leg 108 is bent at a knee portion 126 of the leg 108. The exosuit 110 can be embedded in a garment such as a pair of pants that can be worn on the user's lower body. The exosuit 110 can provide support to the user's lower limbs. In some implementations, the exosuit 110 can be in the form of a brace, pants, an undergarment, or a full-body suit, among other forms of wearable devices.

The exosuit 110 includes a first structure 104 and a second structure 106. The first structure 104 and the second structure 106 are mutually rotatably coupled by a joint 130. For example, the first structure 104 and the second structure 106 can rotate about the joint to increase and decrease an angle formed between the first structure 104 and the second structure 106.

When worn by the user 102, the first structure 104 can be disposed along a first portion of the body of the user 102, e.g., a femoral portion 114 of the leg 108. The second structure 106 can be disposed along a second portion of the body of the user 102, e.g., a tibial portion 116 of the leg 108. The joint 130 can be disposed adjacent to a body joint of the user 102, e.g., the knee portion 126 of the leg 108.

In operation, the first structure 104 and the second structure 106 can be driven to rotate around the joint 130. The first structure 104 can transmit a force to the femoral portion 114, and the second structure 106 can transmit a force to the tibial portion 116. Transmitting the force to the femoral portion 114 and to the tibial portion 116 can assist the user with mobility around the knee portion 126. For example, transmitting the force to the femoral portion 114 and the tibial portion 116 of the leg 108 can assist the user 102 with extension and flexion of the knee. In this way, the exosuit 110 can support the user 102 in movement of the leg 108.

For example, the exosuit 110 can support the user 102 in extension of the leg 108, e.g., movement in the direction of arrows 122. For example, the exosuit 110 can exert a force onto the leg 108 in the direction of arrows 122 to assist in extension of the leg 108.

The exosuit 110 can also support the user 102 in flexion of the leg 108, e.g., movement in the direction of arrows 124. For example, the exosuit 110 can exert a force on the leg 108 in the direction of arrows 124 to assist in flexion of the leg 108.

The exosuit 110 may exert the various forces onto the leg 108 through the garment that is embedded with the exosuit 110. For example, the garment can be coupled to the exosuit 110 and can be in contact with the leg 108. When the exosuit 110 rotates, force is transferred from the first structure 104 and the second structure 106 to the garment and then to the leg 108.

FIGS. 2A-2C show views of an example exosuit 210 that has structures formed of link elements having limited motion between the link elements. In the example of FIGS. 2A-2C, the exosuit 210 includes a first structure 204, a second structure 206, and a joint 230 which includes an actuator. The exosuit 210 is worn on one side of the leg 108, e.g., a lateral side of the right leg 108 of the user 102.

The structures 204, 206 can each support load or torque along one plane while being configured to flex or deflect in a transverse plane. In other words, the structures 204, 206 each have very different moments of inertia in different planes, so that the structures 204, 206 can rigidly transmit force when applied along one plane while also being flexible enough to conform to the shape of the user's body. The example of FIGS. 2A-2C uses structures 204, 206 that are each formed of a series of rigid link elements 220 having joints 221 between them. Nevertheless, there are other ways of providing structures that have different levels of strength and resistance with respect to different directions of force. For example, the shape or materials may be used to set the appropriate force response, such as having a structure be thin in one dimension (e.g., along an axis where flexing should be allowed) and much thicker in another dimension (e.g., along which flexing should not be allowed.)

FIG. 2A shows a side view of the example exosuit 210. In the example of FIG. 2A, the leg 108 is represented by dashed lines and is shown in an extended position.

The first structure 204 and the second structure 206 extend along the lateral side of the user's leg 208. The structures 204, 206 are formed of a series of link elements 220. Each of the link elements 220 can be formed from a rigid material. For example, the link elements 220 can be formed of a metal or hard polymer material. In some implementations, each of the link elements 220 is formed from the same material. In some implementations, some link elements 220 may be formed from different materials.

Each structure 204, 206 has a longitudinal axis, L1, L2 that extends along its length, e.g., from top to bottom through the series of link elements 220. In the example of FIG. 2A, the longitudinal axes L1, L2 extend substantially along a superior-inferior axis of the user.

The first structure 204 has a first width 222 perpendicular to the longitudinal axis L1, and the second structure 206 has a second width 224 perpendicular to the longitudinal axis L2. In the example, the widths 222, 224 are the width of a single link element 220. The first width 222 and the second width 224 are measured along a first axis. In the view of FIG. 2A, the second axis is an anteroposterior axis of the user 102. In addition, or as an alternative, the widths 222, 224 can be measured along an axis 223 of flexion of joints 221 between the link elements 220. In some implementations, the first width 222 and the second width 224 are the same. In some implementations, the first width 222 and the second width 224 are different. In some implementations, the first width 222 and the second width 224 can be perpendicular to the longitudinal axes L1, L2 of the structures 204, 206.

The first structure 204 has a first length 214 and the second structure 206 has a second length 216. The first length 214 and the second length 216 are measured along a second axis, the longitudinal axes L1, L2 of the respective structures 204, 206. The first length 214 can be a sum of element lengths 202 of individual link elements 220 of the first structure 204. The second length 216 can be a sum of element lengths 202 of individual link elements 220 of the second structure 206. In some implementations, the first length 214 and the second length 216 can be the same. In some implementations, the first length 214 and the second length 216 can be different.

The exosuit 210 can be configured to be worn on either or both legs of a user. When worn by the user, the structures of the exosuit 210 can be disposed along the lateral side of the leg or the medial side of the leg 108.

When worn by the user, the first structure 204 is disposed along the upper portion 114 of the leg 108 (e.g., along the thigh or femur). The second structure 206 is disposed along the lower portion 116 of the leg 108 (e.g., along the tibia). The joint 230 is aligned with the knee portion 126 of the leg 108.

The link elements 220 each connect to the next adjacent link element 220 with a joint 221, such as be a hinge or a hinge-like connection. This joint 221 permits rotational movement about an axis 223 of the joint 221, but restricts or disallows other movements. As a result, the joints 221 allow the link elements 220 to rotate relative to each other in a coronal plane (e.g., into the page in FIG. 2A), but do not allow movement or deformation of the link elements 220 in the sagittal plane (e.g., along an anteroposterior axis in FIG. 2A). For simplicity in illustration, only a few of the joints 221 and axes 223 are labeled. Nevertheless each interface between adjacent link elements 220 can include a joint 221 and corresponding axis 223 as discussed.

As a result of the link elements 220 and joints 221 between them, the first structure 204 and the second structure 206 are each rigid along the plane viewed in FIG. 2A. For example, the link elements 220 are connected in a way that prevents the joints 221, and the structure 204, 206 as a whole, from bending or deforming along the longitudinal axis L1, L2 in the sagittal plane of the user 102. The rigidity of the first structure 204 and the second structure 206 along the coronal plan enables the exosuit to exert a force on the leg 108 of the user 102, through the structures 204, 206, to transmit the force along the leg 108 to assist in extension and flexion of the leg 108. When the actuator in the joint 230 initiates a rotational movement R1 to change the angle between the structure 204 and the structure 206 (e.g., to flex the knee), the link elements 220 will transmit the forces to the portions of the leg 108 they are coupled to. As viewed from the lateral side in FIG. 2A, the structures 204, 208 will not flex or deform in the sagittal plane and will remain extending along their respective portions of the leg 108.

The first structure 204 and the second structure 206 can also resist torsion along the longitudinal axis. For example, the link elements 220 can be connected in a way that restricts twisting or rotating along the longitudinal axis of the structure 204, 206 when the user 102 is wearing the exosuit 210. The rigidity of the first structure 204 and the second structure 206 along the longitudinal axes L1, L2 can enable the exosuit 210 to avoid or reduce undesired twisting forces on the leg 108 of the user 102, and to reduce or avoid forces that would cause the position of the fabric of the garment to shift or twist around the leg 108.

FIG. 2B shows a front view of the example exosuit 210, e.g., showing the anterior side. The exosuit 210 is worn on a lateral side or a medial side of the leg 108.

Each link element 220 has a thickness 208. The thickness 208 is measured along a third axis perpendicular to both the first axis (e.g., anteroposterior axis) and the second axis (e.g., longitudinal axis L1 or L2). In this example, the third axis is a mediolateral axis of the user 102. In some implementations, the thickness 208 of each link element 220 is the same. In some implementations, the thicknesses 208 of at least some of the link elements 220 may be different.

The link elements 220 are connected with the joints 221 in a way that allows the first structure 204 and the second structure to bend along the side facing the user's leg 208, e.g., to move through a coronal plane, in the directions of arrow 212 and arrow 215. Thus, the first structure 204 and the second structure 206 can flex and move along the coronal plane. For example, each joint 221 between adjacent link elements 220 can allow rotation about its axis 223, shown as rotation R2 in one example. As shown in FIG. 2B, this flexibility permits the first structure 204 to adjust and conform to the shape of the femoral portion 114 of the leg 108. The flexibility to change shape in response to forces applied along the third axis (e.g., mediolateral axis) also permits the second structure 206 to conform to the shape of the tibial portion 116 of the leg 108.

Before the user puts on the exosuit 210, the joints 221 flex freely about their axes 223, allowing side-to-side movement in the mediolateral axis. This flexibility allows the exosuit to be folded or crumpled allowing storage in a smaller space than a rigid frame or brace would allow. The flexibility also enables the user to more easily put on the exosuit. For example, the exosuit components can be integrated into pants or leggings, which the user pulls on like a normal garment. As the user inserts the leg 108 into the pants, the link elements 220 straighten and are pulled alongside the user's leg, typically with one or more layers of fabric or other material between the structures 204, 206 and the user's leg 108. The joints 221 move so the link elements 220, and thus the overall profile of the structures 204, 206, adjusts to the shape of the side of the leg 108 facing toward the structures 204, 206. The pants or other garment can be fitted closely to the user's body, so that the garment pulls the structures 204, 206 toward the leg 108 and holds them in a stable position against the side of the leg 108. As a result, as shown in FIG. 2B, with the exosuit 210 worn by the user, the user-facing side of the structures 204, 206 substantially conform to the shape of the user's leg 108. In this position, forces transmitted by an actuator of the joint 230 in the exosuit 210 are transmitted to the structures 204, 206, which in turn transmit the forces along their lengths and to the attachment portions that hold the exosuit to the user (e.g., fabric of a garment, or a cuff, strap, or other attachment means).

The first structure 204 has a first proximal end 228 that is coupled to a first side 238 of the joint 230. The first structure 204 has a first distal end 218 that is separated by the joint 230 by the first length 214.

The second structure 206 has a second proximal end 226 that is coupled to a second side 236 of the joint 230. The second structure 206 has a second distal end 219 that is separated by the joint 230 by the second length 216.

FIG. 2C shows a view of the example exosuit 210 showing the side that would face toward the user and engage with the leg 108 of the user. The example is of an exosuit 210 worn on the lateral side of the right leg 108, so the view shows the medial surface of the exosuit 210. As discussed above, the exosuit 210 includes a joint 230 that can be actuated to cause movement of the structures 204, 206 relative to each other. In particular, the joint 230 can cause rotation about an axis. For example, the joint 230 can include a rotating body 242 that is rotatable around a center component 246, such as an axle. Rotation R1 about an axis of the joint 230 changes an angle A between the structure 204 and the structure 206. The joint 230 can include an actuator, such as an electric motor, a hydraulic actuator, an pneumatic actuator, or another type of actuator to impart movement and apply force between the structures 204, 206 to assist with flexion, extension, maintaining a stable position of the user's knee.

FIG. 2D shows a left perspective view of an example exosuit 250 with link elements 220. FIG. 2E shows a right perspective view of the example exosuit 250.

The exosuit 250 includes a left first structure 254d, a left second structure 256d, and a left joint 260d. The exosuit 250 also includes a right first structure 254e, a right second structure 256e, and a right joint 260e. Each of the structures 254a-254d are formed of link elements 220 which provide the differential response to forces in different directions, as discussed above. For example, due to the joints 221 between the link elements 220, the structures 254d, 256d, 254e, 256e provide rigidity in a sagittal plane and flexibility in a coronal plane.

The exosuit 250 can be worn on both legs of a user. When worn by the user, the structures of the exosuit 250 are disposed along the lateral sides of the user's left leg and right leg.

When worn by the user, the left first structure 254d is disposed along the femoral portion 114 of the left leg. The left second structure 256d is disposed along the tibial portion 116 of the left leg. The left joint 260d is aligned with the knee portion 126 of the left leg.

When worn by the user, the right first structure 254e is disposed along the femoral portion 114 of the right leg. The right second structure 256e is disposed along the tibial portion 116 of the right leg. The right joint 260e is aligned with the knee portion 126 of the right leg.

The exosuit 250 includes fabric 270 that extends along and around the user's legs. The fabric 270 is coupled to the first structures 254d, 254e and to the second structures 256d, 256e. For example, the link elements 220 can define holes, and the fabric 270 can have eyelets, and a lacing material (e.g., a cord, string, thread, etc.) can be passed through the holes and eyelets to secure the structures 254d, 256d, 254e, 246e to the fabric 270. When worn by the user, the fabric wraps around the legs of the user, e.g., like pants. The fabric 270 can transmit force from the first structures 254d, 254e and from the second structures 256d, 256e to the legs of the user.

The exosuit 250 can include straps or cuffs that help distribute forces and maintain the alignment of the joints 260d, 260e of the exosuit 250 with respect to the user's knee joint. The exosuit 250 includes a left first cuff 262d and a left second cuff 264d. The left first cuff 262d is coupled to the left first structure 254d and to the fabric 270. The left second cuff 264d is coupled to the left second structure 256d and to the fabric 270.

The exosuit 250 includes a right first cuff 262e and a right second cuff 264d. The right first cuff 262e is coupled to the right first structure 254e and to the fabric 270. The right second cuff 264e is coupled to the right second structure 256e and to the fabric 270.

The left first cuff 262d and the left second cuff 264d can distribute force from the left first structure 254d and the left second structure 256d around the left leg. For example, the left first structure 254d and the left second structure 256d may be disposed along the lateral side of the left leg. The left first cuff 262d and the left second cuff 264d can distribute force from the left first structure 254d and the left second structure 256d to the medial side of the left leg.

Similarly, the right first structure 254e and the right second structure 256e may be disposed along the lateral side of the right leg. The right first cuff 262e and the right second cuff 264e can distribute force from the right first structure 254e and the right second structure 256e to the medial side of the right leg.

FIG. 2F shows a left perspective view of link elements of an example exosuit with link elements. FIG. 2G shows a right perspective view of elements of an example exosuit with link elements.

Each link element 220 has an element width 272 measured along the first axis. The first axis is defined by an anteroposterior axis of the user when wearing the exosuit. In some implementations, the element width 272 of each link element 220 is the same. In some implementations, the element width 272 of each link element 220 may be different.

Each link element 220 has an element length 202 measured along the second axis perpendicular to the first axis. The second axis is defined by a longitudinal axis of the user when wearing the exosuit. In some implementations, the element length 202 of each link element 220 is the same. In some implementations, the element length 202 of each link element 220 may be different.

Each link element 220 can include one or more holes 282. The holes 282 can enable the link elements 220 to be coupled to the fabric 270, e.g., by sewing. A fiber 284, e.g., a thread, cord, string, or lace, can be used to connect the holes 282 of the link elements 220 to eyelets 286 of the fabric 270. In some implementations, the fabric can be sewn around and through portions of the link elements 220 to further integrate the fabric 270 with the reset of the exosuit.

FIG. 2H shows a perspective view of a joint 230 of an example exosuit with link elements.

The joint 230 can include a case 290. The case 290 can house the rotating body 242 that is rotatable around the axle 246. The case 290 can also house a motor assembly. The motor assembly can drive the rotating body 242 to rotate around the axle 246 relative to the case 290. In some implementations, the motor assembly can be powered from one or more batteries integrated into the joint or structures of the exosuit. In some implementations, the motor assembly can be powered from an external power source.

In some implementations, the motor assembly can use an energy-recycling motor. When the user moves, elastic actuators can stretch and recycle the energy stored when stretched to provide support when a user reverses the movement.

The first side 238 of the joint 230 is coupled to the first proximal end 228 of the first structure. The second side 236 of the joint 230 is coupled to the second proximal end 226 of the second structure 206.

FIGS. 3A-3C show views of an example dual-sided exosuit 310, for example, one that has support structures formed of link elements 220 extending along the medial side and lateral side of the leg 108. FIG. 3A shows an outside view of the example dual-sided exosuit 310. FIG. 3B shows an inside view of the example dual-sided exosuit 310. FIG. 3C shows a front view of the example dual-sided exosuit 310. In the example of FIGS. 3A-3C, the leg 108 is represented by dashed lines and is shown in a flexed, or bent, position.

The dual-sided exosuit 310 includes an outside first structure 304a, an outside second structure 306a, and a joint 330 connecting the structures 304a, 306a. The dual-sided exosuit 310 also includes an inside first structure 304b, an inside second structure 306b, a joint 230 connecting the structures 304b, 306b, a first cuff 362, and a second cuff 364.

The outside first structure 304a and the inside first structure 304b are each similar to the first structure 204 of the example exosuit 210. The outside second structure 306a and the outside second structure 306b each function in the same manner as the second structure 206 of the exosuit 210. The joints 330 function in the same manner as the joint 230 of the exosuit 210, being configured to allow and to drive relative movement of the connected structures.

The dual-sided exosuit 310 illustrated shows the components to provide mobility support for a single leg. Another set of components can be provided to be worn on the other leg, so that an exosuit can assist both legs of a user. When worn by the user, the structures of the dual-sided exosuit 310 can be disposed along both the lateral side of the leg 108 and the medial side of the leg 108.

When worn by the user, the outside first structure 304a is disposed along the lateral femoral portion 114 of the leg 108. The outside second structure 306a is disposed along the lateral tibial portion 116 of the leg 108. The joint 230 is aligned with the lateral knee portion 126 of the leg 108.

When worn by the user, the inside first structure 304b is disposed along the medial femoral portion 114 of the leg 108. The inside second structure 306b is disposed along the medial tibial portion 116 of the leg 108.

The first cuff 362 is coupled to the outside first structure 304a and to the inside first structure 304b. The second cuff 364 is coupled to the outside second structure 306a and to the inside second structure 306b.

The first cuff 362 and the second cuff 364 can distribute force around the user's leg. The first cuff 362 and the second cuff 364 can transfer force from the outside first structure 304a to the inside first structure 304b.

For example, an actuator 331 associated with or integrated into the joint 330 may rotate to exert a force in the direction of arrows 322 to assist in extension of the leg 108. The applied extension force is transmitted from the joints 330 to the connected structures, e.g., to structures 304a, 306a on the outer side of the leg 108, and to structures 304b, 306b on the inner side of the leg 108. The exosuit 310 is shown with two joints 330, each having a corresponding actuator 331, but optionally an actuator 331 and joint 330 may be provided only at one side. For example, if the actuator 331 and/or joint 331 is provided only at the lateral side, the extension force may be transmitted from the outside first structure 304a to the inside first structure 304b through the first cuff 362, and from the outside second structure 306a to the inside second structure 306b through the second cuff 364.

FIG. 4A shows a front view of an example exosuit 410 embedded in a garment 402. FIG. 4B shows a left side view of the example exosuit 410 embedded in the garment 402.

The garment 402 has a right-side exosuit portion 410a and a left-side exosuit portion 410b that fit in the garment in defined positions. The right side exosuit 410a is positioned inside a right side channel 420a of a right pant leg 430a. The left side exosuit 410b is positioned inside a left side channel 420b of a left pant leg 430b.

The left side channel 420a and the right side channel 420b ("channels 420") can be, for example, spaces between fabric layers, such as pockets sewn into the right pant leg 430a and the left pant leg 430b ("pant legs 430") to receive the corresponding exosuit portion. The channels 420 can include an inside cloth layer that, when the garment 402 is worn by a user, is positioned against the leg of a user. The channels 420 can also include an outside cloth layer.

The exosuit portions 410a, 410b can be inserted into the channels 420, in between the inside cloth layer and the outside cloth layer. In some implementations, the exosuit portions 410a, 410b can be coupled to the inside cloth layer, the outside cloth layer, or both. For example, the exosuit portions 410a, 410b can be coupled to the inside cloth layer and/or the outside cloth layer by attachment means such as buttons, snaps, zippers, and sewing means.

In some implementations, the exosuit 410 can be removable from the channels 420. For example, the channels 420 can each include an opening that can enable a user to remove the exosuit 410 through the opening. The exosuit portions 410a, 410b can be removed, for example, for purposes of performing maintenance on the exosuits, washing the garment, etc.

In some implementations, the garment 402 might not include the channels 420. In these implementations, the exosuit portions 410a, 410b can be integrated into the garment 402 using another means. For example, the exosuit portions 410a, 410b can be woven or sewn to the pant legs 430. In some examples, the exosuit portions 410a, 410b can be printed to material of the pants legs 430, e.g., using a 3D printer.

The garment 402 can be constructed to have zero ease, e.g., to fit closely to the user's body without space between the fabric and the user's skin. The garment 402 may be constructed to have a negative ease, for example, with garment 402 being smaller than the wearer's leg and the garment 402 being formed of a fabric that stretches to accommodate the wearer. The garment 402 can be designed to fit the user such that the cloth of the garment 402 is firmly in contact with the user's body. In some implementations, the fabric can be nonstretch fabric to enable the cloth to impart forces from the exosuit portions 410a, 410b to the user's body.

The garment 402 can be constructed from a high-strength fabric. For example, the fabric may be composed of a composite material with reinforced fibers. The reinforced fibers can include, for example, carbon fiber, polypropylene fiber, and/or polyethylene fiber.

The garment 402 can have different thicknesses of fabric at different portions in the garment 402. For example, a thickness of the garment 402 in regions near the exosuit 410 may be thinner than a thickness of the garment 402 in regions further from the exosuit 410. Specifically, the thickness of the garment alongside regions of the garment 402 may be thinner than the thickness of the garment 402 along front and back regions of the garment 402. An increased thickness along front and back regions of the garment 402 can improve the transfer of force from the exosuit to the user's body through the garment 402.

Figure 5:
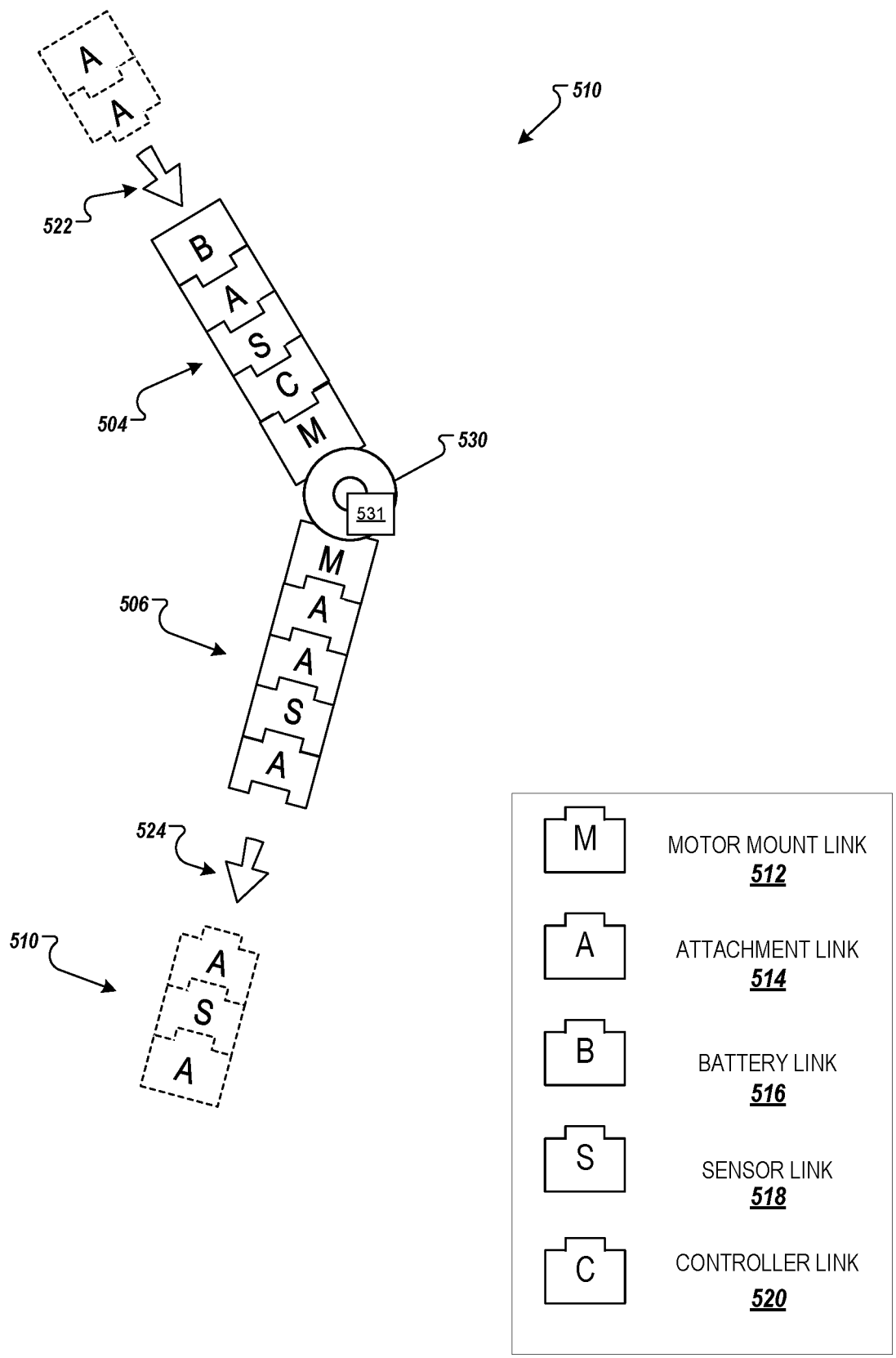
FIG. 5 shows a diagram of an example exosuit that includes modular link elements.

FIG. 5 shows a diagram of an example exosuit 510 that includes link elements that are modular. This example shows that there can be different types of link elements that have different sizes, functions, materials, etc. By combining different sets of link elements, and by changing the sequence of them, the capabilities of the exosuit 510 can be changed. For example, link elements can be added or removed from the exosuit 510 to fit the exosuit for a taller or shorter person. As another example, link elements can be used to attach or position other elements of the exosuit 510, so that the positions of certain link elements also positions other exosuit components relative to the user's body. A link element may include a sensor mount or an integrated sensor device, and the link element with the sensor can be placed at the appropriate position in the chain of link elements to capture data from the desired position.

The exosuit 510 includes a first structure 504, a second structure 506, and a joint 530 that has an associated actuator 531. The first structure 504 and the second structure 506 can each include multiple link elements. In this example, different types of link elements are used, and each type may have different size, shape, materials, functional capabilities, etc. For example, the first structure 504 and the second structure 506 can each include link elements from among types such as motor mount link elements 512, attachment link elements 514, battery link elements 516, sensor link elements 518, and controller link elements 520.

The modular link elements can be attached 522 and detached 524 from the first structure 504 and/or the second structure 506. The modular link elements can be attached 522 in order to extend a length of the exosuit 510. The modular link elements can be detached 524 in order to reduce the length of the exosuit 510.

The modular link elements can be removed for purposes of replacement and maintenance. For example, a faulty sensor link element 518 with a faulty sensor can be removed and replaced with a sensor link element 518 having a functioning sensor. In another example, a faulty link element of any type can be removed, repaired, and reinstalled. The modular link elements can also be rearranged and swapped with one another. For example, an attachment link element 514 can be removed and replaced with a battery link element 516.

The motor mount link elements 512 can provide for attachment of the first structure 504 and the second structure 506 to the joint 530. The motor mount link elements 512 can include an attachment means that couples to the motor assembly of the joint 530.

The attachment link elements 514 can be rigid link elements that are used to extend or reduce the length of the first structure and the second structure. The attachment link elements 514 can be rigid body elements of different sizes. The attachment link elements can be used to customize the size of the exosuit 510 to the user.

The battery link elements 516 can provide battery power to the exosuit. For example, the battery link elements 516 can include batteries, or mounts for attaching batteries, for providing power to the motor assembly of the joint 530. The battery link elements 516 can also provide power to sensors and other powered components of the exosuit 510.

The batteries of the battery link elements can be rechargeable or replaceable. The battery link elements can be connected to the joint 530 and to other powered components of the exosuit 510, e.g., through a wire or cord.

The sensor link elements 518 can include sensors, or mounts for sensors, for detecting movement activity of the user. Detection can be done using electrical, optical, and/or magnetic techniques by sensors such as accelerometers, gyroscopes, magnetometers, inertial measurement units (IMUs), GPS, electromyography (EMG), mechanomyography (MMG), visual sensors, depth sensors, and/or encoders, among other types of detection techniques.

The sensor link elements 518 can also include other sensors for monitoring conditions and characteristics of the environment and/or the user. For example, the sensor link elements 518 can include temperature sensors, infrared sensors, light sensors, heart rate sensors, and blood pressure monitors, among other types of sensors. Sensor link elements 518 can collect and/or record the activity data and provide the activity data to a controller.

In some implementations, the controller may be integrated into the exosuit 510, e.g., in a controller link element 520 or in the joint 530. In some implementations, the controller may be external to the exosuit 510.

The controller link element 520 may include controller circuitry, or a mount to attach controller circuitry, such as one or more processors that control the operation of various components of the exosuit 510, including the motor assembly and sensors. In some cases, memory, processors, and other electronic components may simply be mounted to or attached to link elements such as the controller link elements 520.

The controller for the exosuit 510, which can be integrated with or attached to link elements 520, can generate control signals for the exosuit locally. The one or more processors of the controller can continually and automatically determine control signals for the exosuit 510 without communicating with a remote processing system. For example, the controller can receive user movement feedback data from sensor link elements 518.

The controller can control sensors integrated with or attached to sensor link elements 518 to collect and/or record data associated with movement of the user. The controller can be communicatively connected to sensor link elements 518 and to the motor assembly of the joint 530. In some implementations, controller link elements 520 are connected to sensor link elements 518 and to the motor assembly through communications buses with sealed conduits that protect against solid particles and liquid ingress. In some implementations, controller link elements 520 transmit control signals to components of exosuit 510 wirelessly through various wireless communications methods, such as RF, sonic transmission, electromagnetic induction, etc.

In some implementations, the various types of link elements shown in FIG. 5 connect to each other with purely mechanical connections, such as by a hinged joint. In other implementations, the connections between link elements may include electrical connections as well as mechanical connections at the interface between two link elements. For example, flexible conductors with connectors can be placed at the upper and lower edges of a link element in order to transmit and/or receive power, ground, control signals, sensor data, and other signals. As a result, by connecting one link element to another, e.g., by snapping one onto another, or by inserting a connector portion of one link element into a receiving portion of another, the link elements can establish both a structural or mechanical engagement as well as electrical communication that can be maintained as the exosuit 510 flexes and is worn.

Figure 6:
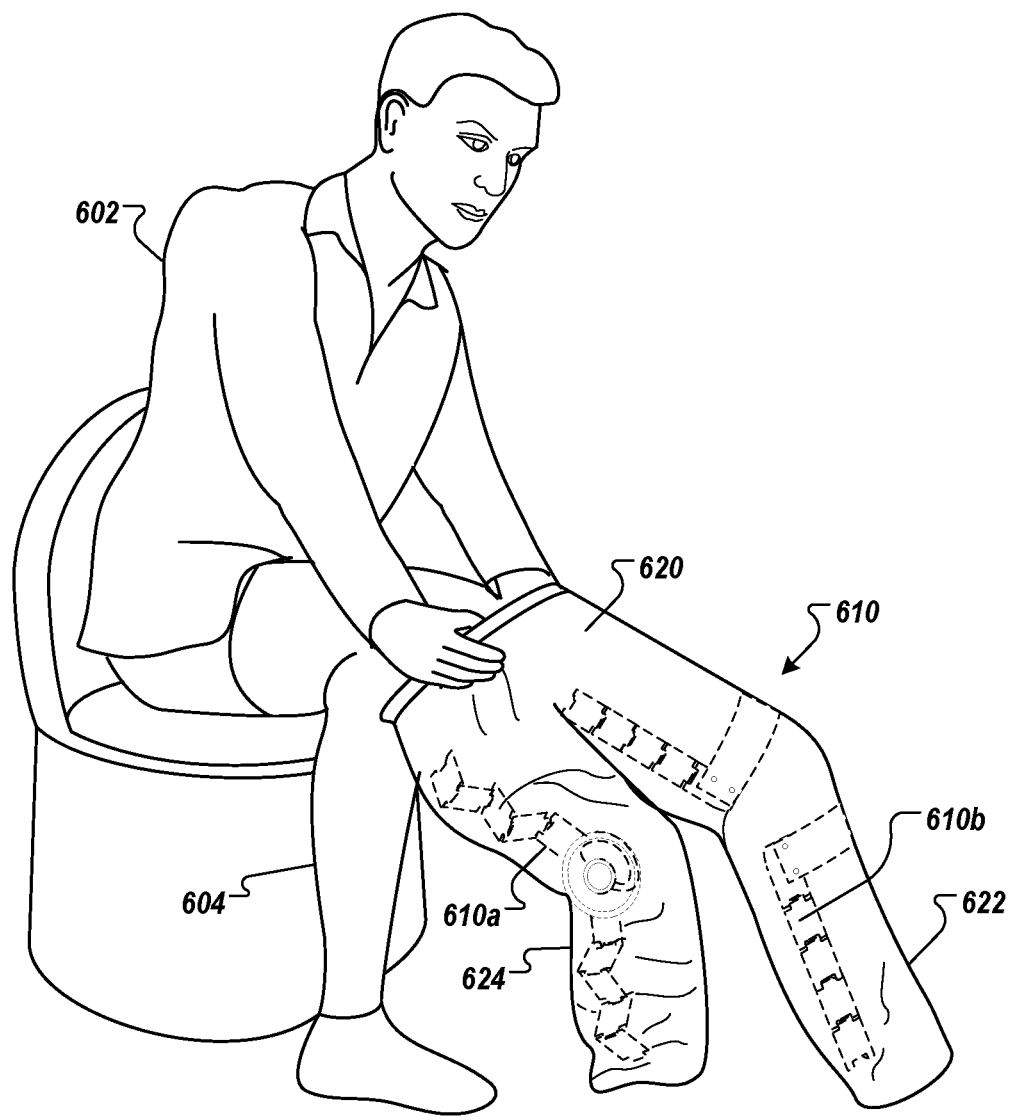
FIG. 6 is an illustration of a user donning an example garment that has an exosuit embedded in it.

FIG. 6 is an illustration of a user 602 donning an example garment 620 that has exosuit components embedded within it. The garment 620 includes a right-side exosuit portion 610*a* and a left-side exosuit portion 610*b*, together referred to as exosuit 610. The right-side exosuit portion 610*a* is embedded in a right pant leg 624 of the garment 620. The left-side exosuit portion 610*b* is embedded in a left pant leg 622 of the garment 620. The left-side exosuit portion 610*b* and the right-side exosuit portion 610*a* are each collapsible and flexible to allow movement in a plane, such as a coronal plane, so that the link elements can move in response to forces applied in a direction along a mediolateral axis.

The user 602 has not yet inserted his right leg 604 into the right pant leg 624. Prior to the user inserting his right leg 604 into the right pant leg 624, the right-side exosuit portion 610*a* is in a collapsed state. In the collapsed state, the individual link elements of the right-side exosuit portion 610*a* can flex and fold through movement through a single plane.

In the example of FIG. 6, the user 602 has inserted his left leg at least partially into the left pant leg 622. As the user inserts his left leg into the left pant leg 622, the left-side exosuit portion 610*b* becomes taut. As the left-side exosuit portion 610*b* becomes taut, the individual link elements of the left-side exosuit portion 610*b* conform to the shape of the user's left leg.

The flexibility and collapsibility of the exosuit 610 can allow the garment 602 to crumple and fold with the exosuit 610 within it. Therefore, the flexibility and collapsibility of the exosuit 610 allow the user 602 to don and doff the garment 620 with ease.

FIGS. 7A-7C show an outer side view, a front view, and an inner side view of another implementation of an example exosuit 710. The exosuit 710 does not include link elements. In the example of FIGS. 7A-7C, the exosuit 710 includes a first structure 704, a second structure 706, and a joint 730, and is worn on one side of the leg 108, e.g., a lateral side of the right leg 108 of the user 102.

FIG. 7A shows a side view of the example exosuit 710. In the example of FIG. 7A, the leg 108 is represented by dashed lines and is shown in an extended position.

Like the other exosuits discussed above, the exosuit 710 provides a different moment of inertia with respect to forces applied from different directions. For example, the exosuit 710 can provide flexibility to yield or bend in response to forces applied on one plane (e.g., a coronal plane, or more specifically along a medial-lateral axis) while resisting forces applied in a perpendicular plane (e.g., the sagittal plane, thus resisting forces applied along an anterior-posterior axis). Unlike the other exosuits, however, the exosuit 710 does not use a series of link elements with joints connecting them. Instead, the exosuit uses a single solid element for each structure 704, 706, where the each structure 704, 706 has a material and/or shape that provides differential responses to forces from different directions. For example, the structures 704, 706 can each be thicker along one axis than another, with the thicker dimension oriented to resist forces that are not desired to deform the structure 704, 706, and with the thinner dimension oriented to allow deformation.

The first structure 704 and the second structure 706 can be formed from a rigid or semi-rigid material. The first structure 704 and the second structure 706 can each be formed from, for example, a metal or polymer material and can include reinforced fibers.

The first structure 704 has a first width 722 and the second structure 706 has a second width 724. The first width 722 and the second width 724 are measured along a first axis. The first axis is defined by an anteroposterior axis of the user 102 when wearing the exosuit 710. In some implementations, the first width 722 and the second width 724 are the same. In some implementations, the first width 722 and the second width 724 are different.

In some implementations, the first width 722 and the second width 724 are each variable along a length. For example, the first width 722 and the second width 724 may be greater near the joint 730 than at a distance away from the joint 730. In some implementations, the first width 722 and the second width 724 may each gradually taper along a length.

The first structure 704 has a first length 714 and the second structure 706 has a second length 716. The first length 714 and the second length 716 are measured along a second axis perpendicular to the first axis. The second axis is defined by a longitudinal axis of the user 102 when wearing the exosuit 710. In some implementations, the first length 714 and the second length 716 can be the same. In some implementations, the first length 714 and the second length 716 can be different.

The exosuit 710 can be designed for a single leg as shown. The components can be duplicated so another copy can be worn on the other leg, so the exosuit 710 provides support for both legs. The structures of the exosuit 710 can be placed to lie along a lateral side of the leg 108, along a medial side of the leg 108, or to include structures at both medial and lateral sides of the user's leg 108.

Specifically, when worn by the user, the first structure 704 is disposed along the femoral portion 114 of the leg 108. The second structure 706 is disposed along the tibial portion 116 of the leg. The joint 730 is aligned with the knee portion 126 of the leg 108.

The first structure 704 and the second structure 706 are each rigid along the first axis. For example, the material and construction of the first structure 704 and the second structure 706 prevents bending along the anteroposterior axis of the user 102 when the user 102 is wearing the exosuit 710. The rigidity of the first structure 704 and the second structure 706 along the first axis enables the exosuit to exert a force on the leg 108 of the user 102 to assist in extension and flexion of the leg 108.

The first structure 704 and the second structure 706 can also be rigid along a torsional axis. For example, the material and construction of the first structure 704 and the second structure 706 can prevent twisting or rotating along the longitudinal axis of the user 102 when the user 102 is wearing the exosuit 710. The rigidity of the first structure 704 and the second structure 706 along the torsional axis can enable the exosuit to prevent the leg 108 of the user 102 from twisting.

FIG. 7B shows a front view of the example exosuit 710. The exosuit 710 is worn on a lateral side or a medial side of the leg 108. The leg 108 is represented by dashed lines.

The first structure 704 has a first proximal end 728 that is coupled to a first side 738 of the joint 730. The first structure 704 has a first distal end 718 that is separated by the joint 730 by the first length 714.

The first structure 704 has a first thickness 708. The second structure 706 has a second thickness 709. The first thickness 708 and the second thickness 709 are each measured along a third axis perpendicular to both the first axis and the second axis. The third axis is a mediolateral axis in this example.

In some implementations, the first thickness 708 is variable along the first length 714. For example the first thickness 708 may be thinner near the first distal end 718 than near the first proximal end 728. In some implementations, the second thickness 709 is variable along the second length 716. For example the second thickness 709 may be thinner near the second distal end 719 than near the second proximal end 726.

The construction and materials of the first structure 704 and the second structure 706 allow the first structure 704 and the second structure 706 to bend in the directions of arrow 712 and arrow 715. Thus, the first structure 704 and the second structure 706 are each flexible along the third axis. The structures 704, 706 can be resilient and deform only temporarily or while under load (e.g., while pressed against the user's leg 108). As shown in FIG. 7B, flexibility along the third axis permits the first structure 704 to conform to the shape of the femoral portion 114 of the leg 108. Flexibility along the third axis also permits the second structure 706 to conform to the shape of the tibial portion 116 of the leg 108.

The second structure 706 has a second proximal end 726 that is coupled to a second side 736 of the joint 730. The second structure 706 has a second distal end 719 that is separated by the joint 730 by the second length 716.

FIG. 7C shows a view of an inner side of the example exosuit 710, e.g., the side that would face toward a user's leg. Specifically, FIG. 7C shows a view of the exosuit 710 from a perspective of the right leg 108 when worn on the lateral side of the right leg 108. As shown in FIG. 7C, the joint 730 can include a rotating body 742 that is rotatable around an axle 746.

FIG. 8A is an illustration of an example exosuit being worn by a user 802a. The exosuit 810a is worn on an arm 808a of the user 802a. In the example of FIG. 8A, the user's arm 808a is bent at an elbow portion 826 of the arm 808a. The exosuit 810a can be embedded in a garment such as a shirt that can be worn on the user's upper body. In some implementations, the exosuit 810a can be in the form of a brace, an under-garment, a sleeve, or a full-body suit, among other forms of garments.

The exosuit 810a includes a first structure 804a and a second structure 806a. The first structure 804a and the second structure 806a are mutually rotatably coupled by a joint 830a. For example, the first structure 804a and the second structure 806a can rotate about the joint 830a to increase and decrease an angle formed between the first structure 804a and the second structure 806a.

When worn by the user 802a, the first structure 804a can be disposed along an aftarm portion 814a of the arm 808a. The second structure 806a can be disposed along a forearm portion 816a of the arm 808a. The joint 830a can be disposed adjacent to the elbow portion 826a of the arm 808a.

The exosuit 810a can support the user 802a in movement of the arm 808a. For example, the exosuit 810a can support the user 802a in extension of the arm 808a and in flexion of the arm 808a.

FIG. 8B is an illustration of an example exosuit being worn by a user 802b. The exosuit 810b is worn on a hip 808b of the user 802b. In the example of FIG. 8B, the user's hip 808b is bent. The exosuit 810b can be embedded in a garment such as a brace, an under-garment, a high-waisted pant, a torso suit, or a full-body suit, among other forms of garments.

The exosuit 810b includes a first structure 804b and a second structure 806b. The first structure 804b and the second structure 806b are mutually rotatably coupled by a joint 830b. For example, the first structure 804b and the second structure 806b can rotate about the joint 830b to increase and decrease an angle formed between the first structure 804b and the second structure 806b.

When worn by the user 802a, the first structure 804b can be disposed along a torso 814b of the user 802b. The second structure 806b can be disposed along a femoral portion 816b of a leg of the user 802b. The joint 830b can be disposed adjacent to the hip joint of the user 802b.

The exosuit 810b can support the user 802b in movement of the hip 808b. For example, the exosuit 810b can support the user 802b in extension of the hip 808b and in flexion of the hip 808b.

FIG. 8C is an illustration of an example exosuit being worn by a user 802c. The exosuit 810c is worn on a shoulder 808c of the user 802c. In the example of FIG. 8A, The exosuit 810c can be embedded in a garment such as a shirt that can be worn on the user's upper body. In some implementations, the exosuit 810c can be in the form of a brace, an under-garment, a sleeve, or a full-body suit, among other forms of garments.

The exosuit 810c includes a first structure 804c and a second structure 806c. The first structure 804c and the second structure 806c are mutually rotatably coupled by a joint 830c. For example, the first structure 804c and the second structure 806c can rotate about the joint 830c to increase and decrease an angle formed between the first structure 804c and the second structure 806c.

When worn by the user 802a, the first structure 804c can be disposed along a scapular region 814c of the user 802c. The second structure 806c can be disposed along an aftarm region 816c of the user 802c. The joint 830c can be disposed adjacent to the shoulder 808c of the user 802c.

The exosuit 810c can support the user 802c in movement of the shoulder 808c. For example, the exosuit 810c can support the user 802c in abduction of the shoulder 808c and in adduction of the shoulder 808c.

Although the disclosure herein has been described with reference to particular implementations, it is to be understood that these implementations are merely illustrative of the principles and applications of the present disclosure. It is therefore to be understood that numerous modifications may be made to the illustrative implementations and that other arrangements may be devised without departing from the spirit and scope of the present disclosure as defined by the appended claims. For example, elements of one described implementation may be combined with elements of another described implementation without departing from the scope of the disclosure.

What is claimed is:

1. An exosuit comprising:
a first structure that includes a first series of link elements joined together by joints, wherein the first series of link elements extends along a length of the first structure, wherein the joints are configured to flex such that, when the exosuit is worn by a user, the first structure at least partially conforms to a shape of the user's anatomy at a first side of the first structure that extends along the length of the first structure, and wherein the joints restrict flexing that would deform a second side of the first structure that extends along the length of the first structure;
a second structure that includes a second series of link elements joined together by joints, wherein the joints are configured to flex to enable the second structure to conform to a shape of the user's anatomy at a first side of the second structure, and wherein the joints restrict flexing that would deform a second side of the second structure;
an actuator coupled to the first structure and the second structure, wherein the actuator is configured to cause movement of the first structure relative to the second structure; and
an attachment portion to attach the exosuit to the user with the first side of the first structure facing toward the user, wherein the attachment portion comprises a garment, the exosuit being attached to the garment.

2. The exosuit of claim 1, wherein the joints are hinge connections between link elements.

3. The exosuit of claim 1, wherein each joint has an axis, and each joint is configured to bend about its axis and to resist bending in directions other than about its axis.

4. The exosuit of claim 3, wherein the respective axes of the joints are substantially parallel to each other.

5. The exosuit of claim 3, wherein the exosuit is configured to be worn with the length of the first structure extending along a medial or lateral side of a leg of the user, with the first structure being positioned along the thigh of the user or the lower leg of the user, such that (i) the axes of the joints extend in a substantially anteroposterior direction when worn by the user, the joint permitting relative movement of the link elements to adjust the shape of the first structure through a coronal plane of the user, and (ii) the joints of the first structure resist movements that would deform the first structure through a sagittal plane of the user.

6. The exosuit of claim 1, wherein each joint connects two adjacent link elements and is configured to flex about a corresponding axis and to disallow other relative movement between the two adjacent link elements connected by the joint.

7. The exosuit of claim 1, wherein the exosuit is configured to place the first structure along an upper portion of a limb of the user and to place the second structure along a lower portion of the limb when worn by the user.

8. The exosuit of claim 1, wherein the exosuit is configured to place the first structure along a medial or lateral side of:
an upper portion of an arm of the user,
a lower portion of an arm of the user,
an upper portion of a leg of the user, or
a lower portion of a leg of the user.

9. The exosuit of claim 1, wherein the actuator is configured to drive at least one of the first structure or the second structure to cause rotational movement of the first structure relative to the second structure about an axis.

10. The exosuit of claim 1, wherein the exosuit is configured to place the actuator adjacent to a body joint of the user when the exosuit is worn by the user, the actuator being configured to provide force to actuate the body joint of the user by transmitting forces to the first structure and second structure which in turn transmit forces to portions of the user's body through the attachment portion.

11. The exosuit of claim 10, wherein the movement caused by the actuator between the first structure and the second structure assists with extension and flexion of the body joint.

12. The exosuit of claim 10, wherein the body joint comprises a knee, an elbow, a hip, or a shoulder of the user.

13. The exosuit of claim 1, wherein the first structure is positioned between fabric layers of the garment.

14. The exosuit of claim 1, wherein the exosuit is attached to the garment by one or more of buttons, snaps, zippers, or sewing.

15. The exosuit of claim 1, wherein the exosuit is removable from the garment.

16. The exosuit of claim 1, wherein the first series of link elements comprises a chain of link elements having a first length extending from a first end to a second end, the first structure being coupled to the actuator at the first end, the exosuit comprising:
a connecting portion coupled to the first structure; and
a third structure coupled to the connecting portion, the third structure having a third length extending approximately parallel to the first length, wherein, when worn by the user, the first structure is disposed along a side of a limb of the user and the third structure is disposed along another side of the limb of the user.

17. The exosuit of claim 1, wherein the actuator is an electric motor, a hydraulic actuator, or a pneumatic actuator.

18. The exosuit of claim 1, wherein the first structure couples to the actuator at a first proximal end, the first series of link elements extending along the length of the first structure from the first proximal end to a first distal end of the first structure.

19. An exosuit comprising:
a first structure that includes a first series of link elements joined together by joints, wherein the first series of link elements extends along a length of the first structure, wherein the joints are configured to flex such that, when the exosuit is worn by a user, the first structure at least partially conforms to a shape of the user's anatomy at a first side of the first structure that extends along the length of the first structure, and wherein the joints restrict flexing that would deform a second side of the first structure that extends along the length of the first structure;
a second structure that includes a second series of link elements;
an actuator coupled to the first structure and the second structure, wherein the actuator is configured to cause movement of the first structure relative to the second structure; and
an attachment portion to attach the exosuit to the user with the first side of the first structure facing toward the user, wherein the attachment portion comprises a garment, the exosuit being attached to the garment, wherein:

the first structure couples to the actuator at a first proximal end, the first series of link elements extending along the length of the first structure from the first proximal end to a first distal end of the first structure, and the second structure couples to the actuator at a second proximal end, the second series of link elements extending along a length of the second structure from the second proximal end to a second distal end of the second structure.

\* \* \* \* \*